United States Patent [19]
Roberts

[11] Patent Number: 5,318,657
[45] Date of Patent: Jun. 7, 1994

[54] DRIP IRRIGATION TAPE AND METHOD OF MANUFACTURE

[76] Inventor: James C. Roberts, 700 Ranchero Dr., San Marcos, Calif. 92069-3093

[21] Appl. No.: 15,080

[22] Filed: Feb. 8, 1993

Related U.S. Application Data

[60] Continuation of Ser. No. 722,535, Jun. 27, 1991, abandoned, which is a division of Ser. No. 485,778, Feb. 22, 1990, abandoned, which is a continuation of Ser. No. 332,588, Apr. 3, 1989, abandoned, which is a continuation-in-part of Ser. No. 156,413, Feb. 16, 1988, abandoned.

[51] Int. Cl.$^5$ .................... B05B 15/00; B29C 53/08
[52] U.S. Cl. .................... 156/466; 156/203; 156/209; 156/218; 156/244.25; 239/542
[58] Field of Search .............. 239/542, 547; 156/466, 156/582, 553, 203, 209, 217, 218, 244.15, 244.18, 244.25; 264/284; 425/385, 407

[56] References Cited

U.S. PATENT DOCUMENTS

| | | | |
|---|---|---|---|
| Re. 28,095 | 7/1974 | Chapin | 61/12 |
| 1,761,281 | 6/1930 | Taub | |
| 2,749,180 | 6/1956 | Andrews | 299/104 |
| 3,361,359 | 1/1968 | Chapin | 239/145 |
| 3,426,544 | 2/1969 | Curtis | 61/13 |
| 3,540,223 | 11/1970 | Ebbe | 61/12 |
| 3,613,309 | 10/1971 | Coburn | 47/38 |
| 3,669,357 | 6/1972 | Overbey | 239/310 |
| 3,672,571 | 6/1972 | Goodricke | 239/145 |
| 3,727,345 | 4/1973 | Smith | 47/2 |
| 3,736,755 | 6/1973 | Hammond et al. | 61/12 |
| 3,739,522 | 6/1973 | Greenbaum | 47/34.13 |
| 3,774,850 | 11/1973 | Zeman | 239/542 |
| 3,797,754 | 3/1974 | Spencer | 239/542 |
| 3,860,179 | 1/1975 | Costa | 239/542 |
| 3,866,833 | 2/1975 | Shibata et al. | 239/76 |
| 3,870,236 | 3/1975 | Sahagun-Barragan | 239/542 |
| 3,872,621 | 3/1975 | Greenbaum | 47/1.2 |
| 3,874,598 | 4/1975 | Havens | 239/542 |
| 3,887,138 | 6/1975 | Gilead | 239/542 |
| 3,887,139 | 6/1975 | Pearce | 239/542 |
| 3,896,999 | 7/1975 | Barragán | 239/542 |
| 3,899,135 | 8/1975 | O'Brian | 239/534 |
| 3,903,929 | 9/1975 | Mock | 138/115 |
| 3,911,187 | 10/1975 | Raley | 264/284 |

(List continued on next page.)

FOREIGN PATENT DOCUMENTS

| | | | |
|---|---|---|---|
| 2643377 | 4/1979 | Australia | |
| 2060377 | 7/1981 | Australia | |
| 0129151 | 12/1984 | European Pat. Off. | |
| 0196763 | 10/1986 | European Pat. Off. | 239/542 |
| 2642623 | 3/1978 | Fed. Rep. of Germany | |
| 2835117 | 2/1979 | Fed. Rep. of Germany | |
| 43263 | 9/1973 | Israel | |
| 1286538 | 8/1972 | United Kingdom | |

Primary Examiner—Michael W. Ball
Assistant Examiner—Daniel J. Stemmer
Attorney, Agent, or Firm—Brown, Martin, Haller & McClain

[57] ABSTRACT

A drip irrigation tape consists of a strip of flexible material having an elongated, indented channel formed along a first side edge, the channel being of serpentine configuration, the strip being folded lengthwise so that the side edges overlap to form a first conduit, and the opposite side edges being joined together at least along spaced seal lines along opposite edges of the channel to define a secondary conduit. Inlets and outlets are provided along the length of the channel. A method for manufacturing the tape includes the steps of forming the indented channel on a mandrel before sealing the overlapping edges of the strip together by heat sealing or ultrasonic welding.

6 Claims, 5 Drawing Sheets

U.S. PATENT DOCUMENTS

| | | | |
|---|---|---|---|
| 3,939,875 | 2/1976 | Osborn et al. | 138/178 |
| 3,946,762 | 3/1976 | Green | 138/140 |
| 3,988,396 | 10/1976 | Stannard | 261/124 |
| 3,998,392 | 12/1976 | St. Clair | 239/547 |
| 4,009,832 | 3/1977 | Tiedt | 239/542 |
| 4,022,384 | 5/1977 | Hoyle et al. | 239/542 |
| 4,047,995 | 9/1977 | Leal-Diaz | 156/203 |
| 4,053,109 | 10/1977 | Gilead | 239/542 |
| 4,061,272 | 12/1977 | Winston | 239/145 |
| 4,123,006 | 10/1978 | Yukishita | 239/266 |
| 4,126,998 | 11/1978 | Gilead | 405/51 |
| 4,139,159 | 2/1979 | Inoue et al. | 239/547 |
| 4,170,044 | 10/1979 | Steimle | 4/172.15 |
| 4,173,309 | 11/1979 | Drori | 239/547 |
| 4,175,882 | 11/1979 | Gilead | 405/43 |
| 4,177,946 | 12/1979 | Sahagun-Barragan | 239/533.1 |
| 4,210,287 | 7/1980 | Mehoudar | 239/542 |
| 4,211,743 | 7/1980 | Nauta | 425/385 |
| 4,247,051 | 1/1981 | Allport | 239/542 |
| 4,285,472 | 8/1981 | Okada et al. | 239/542 |
| 4,359,442 | 11/1982 | Cleminson | 264/284 |
| 4,385,727 | 5/1983 | Spencer | 239/107 |
| 4,413,787 | 11/1983 | Gilead et al. | 239/542 |
| 4,473,191 | 9/1984 | Chapin | 239/542 |
| 4,474,330 | 10/1984 | Langa | 239/450 |
| 4,534,515 | 8/1985 | Chapin | 239/542 |
| 4,541,569 | 9/1985 | Langa | 239/450 |
| 4,626,130 | 12/1986 | Chapin | 405/44 |
| 4,722,759 | 2/1988 | Roberts et al. | 156/466 |
| 4,726,520 | 2/1988 | Brown et al. | 239/542 |
| 4,763,842 | 8/1988 | Dunn | 239/542 |
| 4,807,668 | 2/1989 | Roberts | 138/103 |
| 4,874,132 | 10/1989 | Gilead | 239/542 |

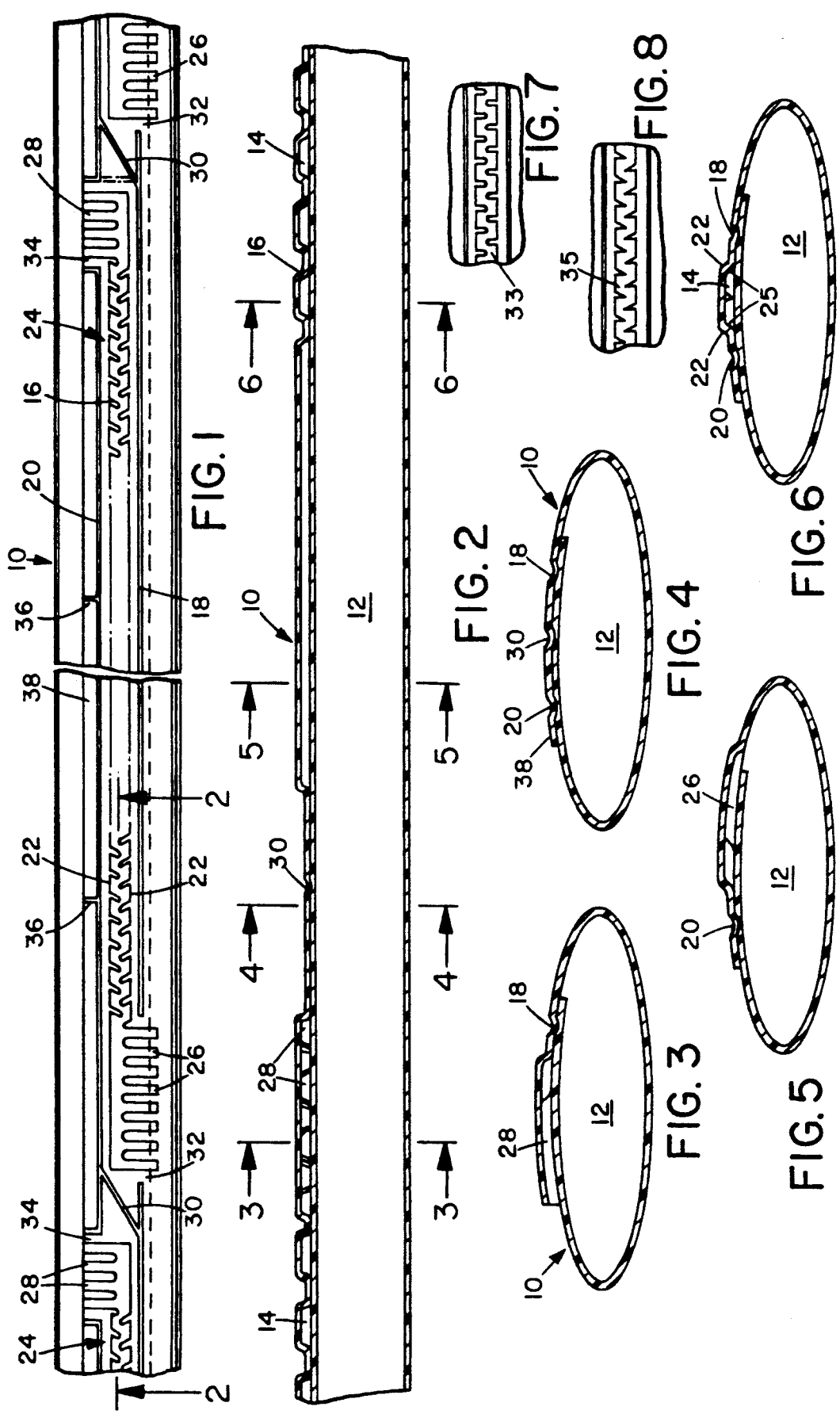

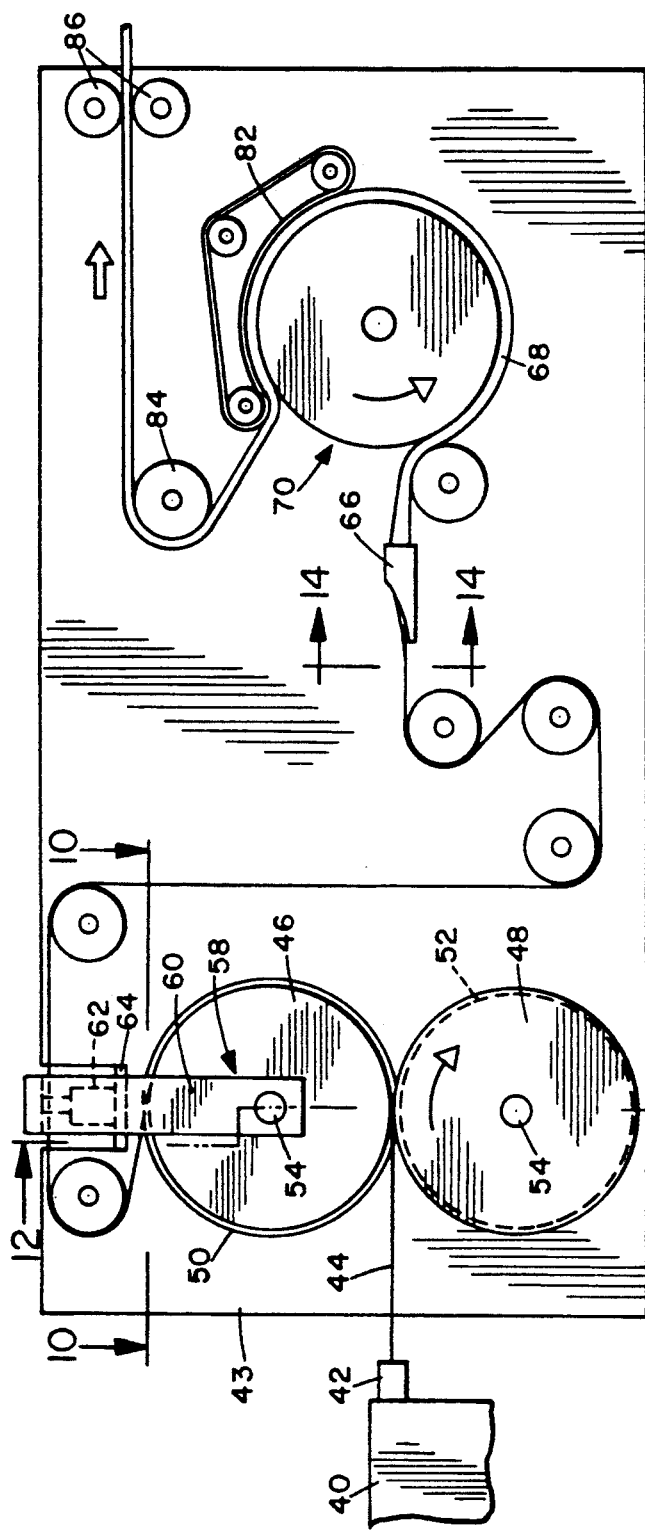
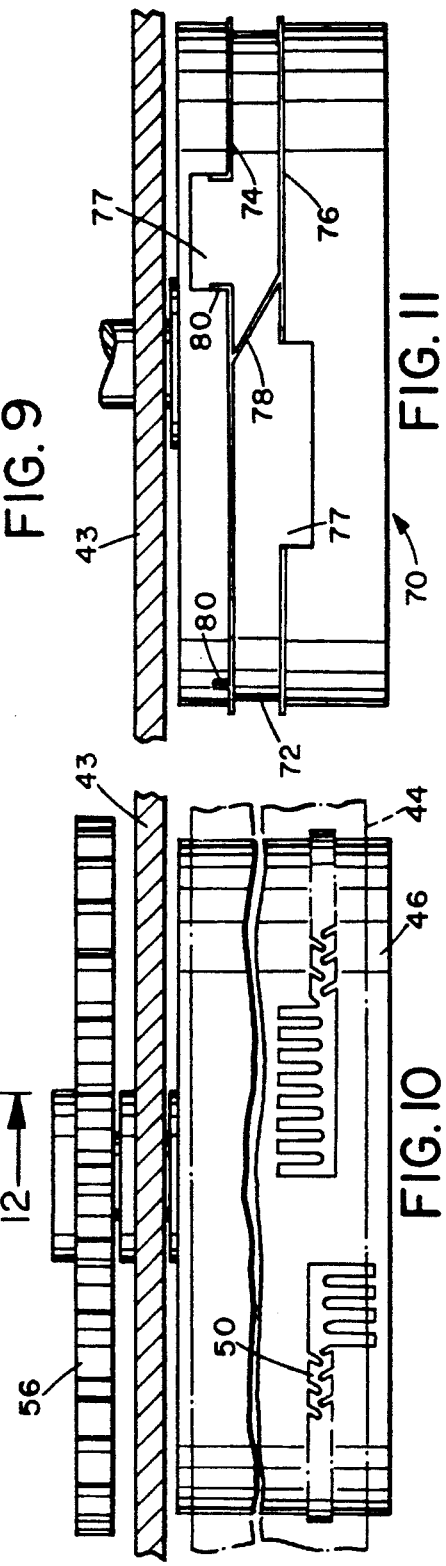

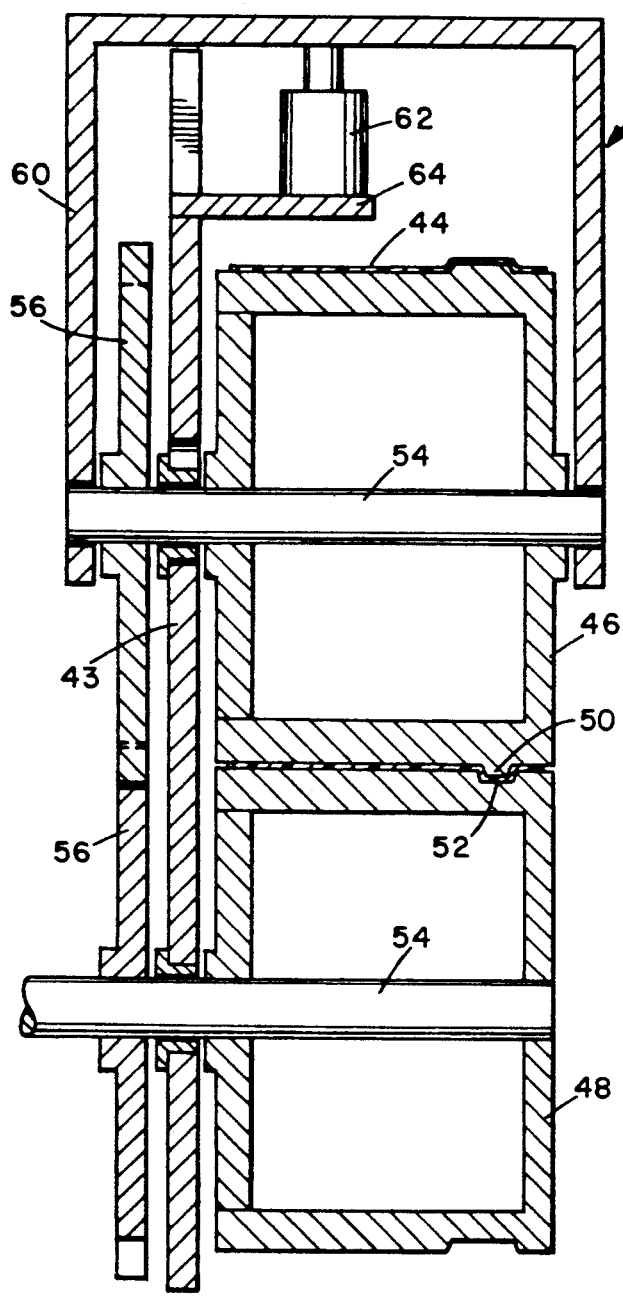
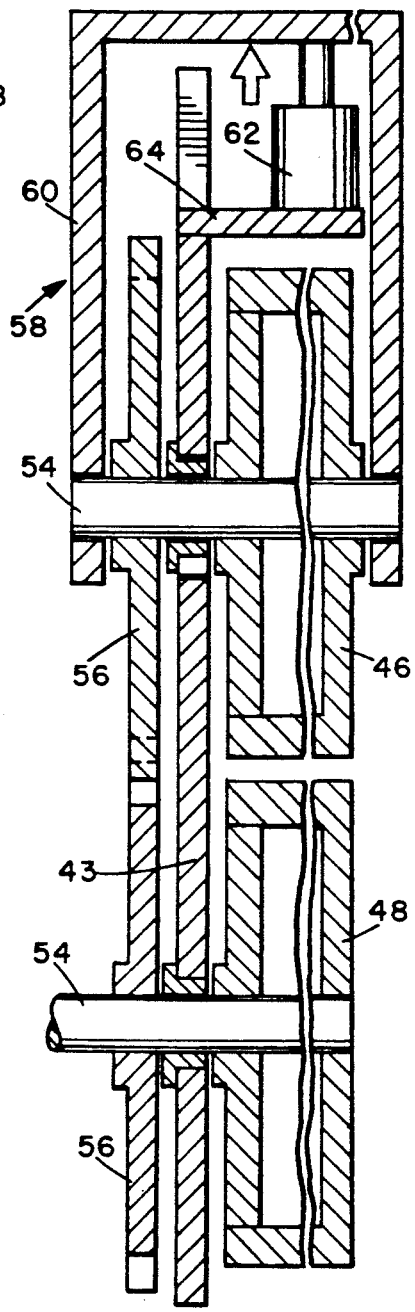
FIG. 12                    FIG. 13
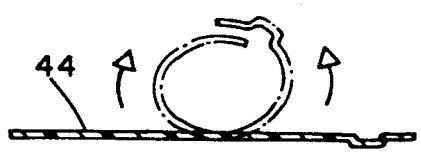
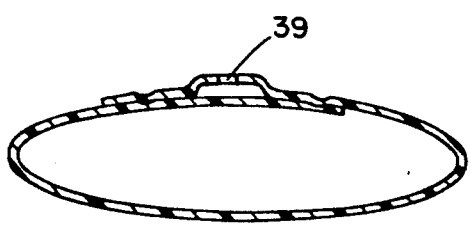
FIG. 14                    FIG. 18

DRIP IRRIGATION TAPE AND METHOD OF MANUFACTURE

This is a continuation of application Ser. No. 07/722,535, filed Jun. 27, 1991, which was a divisional of application Ser. No. 07/485,778 filed Feb. 22, 1990, which was a continuation of application Ser. No. 07/332,588 filed Apr. 3, 1989, which was a continuation of application Ser. No. 07/156,413 filed Feb. 16, 1988 all now abandoned.

CROSS REFERENCE TO RELATED APPLICATIONS

U.S. Pat. No. 4,722,759 of Roberts et al. and U.S. Pat. No. 4,807,668 of Roberts are related to this application.

BACKGROUND OF THE INVENTION

This invention relates generally to drip irrigation tape and to methods and apparatus for fabricating such tape.

The drip irrigation system consists of lengths of plastic tubing or tape placed above ground or underground near the roots of plants, the tubing having numerous small outlets supplying drops of water continuously to the plants. This allows the amount of water supplied to be controlled more precisely, conserving water, improving crops and reducing salt accumulation and fertilizer loss in the soil.

In my previous U.S. Pat. Nos. 4,722,759 and 4,807,668, referred to above, a drip irrigation tape is described in which a strip of flexible material is formed with an indented groove extending lengthwise adjacent one side edge of the strip, the other side edge being folded over to overlap the first side edge and form a first or main water conduit. The overlapping side edges are sealed together on opposite sides of the groove to form a seam in which the groove defines a secondary conduit. Spaced inlets from the first conduit to the secondary conduit and outlets from the secondary conduit are provided, so that fluid supplied to the first conduit flows into the secondary conduit and from there leaks slowly out of the outlets into the surrounding soil.

A method and apparatus for fabricating such tape was described in my previous patents, which consisted of first forming the groove on a vacuum drum, then folding the strip lengthwise before sealing the overlapping edges at or close to the opposite sides of the groove by means of a heat sealing wheel.

In my previous patents the secondary conduit was formed by a straight, continuous or segmented channel. However, there is some advantage in providing a non-straight path to create some turbulence in the fluid flowing along the channel or conduit. Thus, in U.S. Pat. No. 4,473,191 of Chapin one of the embodiments shows a drip irrigation tape in which the flow restricting passage is in the form of a zig-zag or serpentine path. In this case the passage is formed by depositing a flat ribbon of plastic onto one side edge of the tape and then deforming the ribbon to form the serpentine path using a suitable molding wheel. One problem with zig-zag flow restricting passages is that small particles of soil or dirt may become trapped in the confined space of the passage, blocking flow along the passage and thus reducing or stopping the flow of water into the soil.

SUMMARY OF THE INVENTION

It is an object of the present invention to provide an improved drip irrigation tape and method and apparatus for producing such tape.

According to one aspect of the present invention a drip irrigation tape is provided which comprises a strip of flexible material having an elongate indented channel formed in one face of the strip along a first side edge portion by molding the strip while hot, the channel being of serpentine shape, the strip being folded lengthwise so that a second side edge portion overlaps the first portion to form a main conduit, and the first and second side edge portions being sealed together at least along the opposite sides of the channel so that the channel defines a secondary conduit. Spaced inlets are provided connecting the main conduit to the channel, and spaced outlets are provided to connect the channel to the exterior of the structure. The serpentine channel may be continuous along the length of the tape, or may be divided into separate lengths or segments by means of transverse seal lines, each segment having inlets at one end and outlets at the opposite end.

The seal lines joining the overlapping tape portions together may be spaced from the outer side edges of the channel so that if any dirt or sand blocks the serpentine channel, the back up pressure of water behind the blockage will force the overlapping, unconnected flat tape portions on either side of the channel to deform outwardly, tending to shift or release the blockage. This has been found to reduce such blockages substantially, leading to improved flow characteristics.

The overlapping side edge portions may be sealed together wherever they contact one another, i.e. everywhere except the indented areas of the serpentine channel, for example by means of heat sealing or ultrasonic welding. Alternatively, they may be sealed only along spaced seal lines extending along opposite sides of the channel and wherever they are in contact within the channel. In the latter case, formation of the outermost seal line leaves a free flap along the outer edge of the second edge portion. It has been found that roots tend to grow along this flap between the flap and the underlying tape, leading to blockages of the outlets if they are formed by gaps in the seal line. Optionally, the tape may be provided with a series of root deflectors extending from the outermost seal line to the outer edge of the overlapping tape portion. These may comprise seal lines extending outwardly transverse to the outermost elongate seal line, for example. In this way roots are prevented from growing along the tape underneath the flap. However, in the preferred embodiment, this problem is avoided by providing outlets comprising orifices or holes pierced in the outermost wall of the secondary conduit. The inlets preferably also comprise orifices in the inner wall of the secondary conduit. The strip is preferably folded with the second edge portion on the outside, so that the indented channel is inside the body of the tape and the tape itself has relatively smooth outer surface.

According to another aspect of the present invention, a method of making drip irrigation tape is provided, which comprises the steps of extruding a strip of flexible material, shaping the strip while hot to define an indented groove extending along a first edge portion by passing the strip between opposed forming rollers one of which has a projecting mandrel extending around its circumference and the other of which has an annular channel for receiving the mandrel, folding the strip lengthwise with the edge portions overlapping to form a first conduit, and joining the first edge portion and the second edge portion together at least along the opposite sides of the groove so that the groove defines a secondary conduit, forming a series of inlet ports between the main conduit and the secondary conduit and forming a series of outlet ports between the secondary conduit and the exterior of the structure.

This method may be used to form a straight channel or a serpentine channel, with the shaping mandrel being formed appropriately according to the desired channel pattern.

Preferably the strip is extruded with a thickened portion extending along the side edge portion where the channel is to be formed, so that when the thickened portion is deformed to form the indented channel, the channel wall is not thinned and weakened but will be of substantially the same thickness as the remainder of the strip.

An apparatus for fabricating drip irrigation tape is provided according to another aspect of the present invention, the apparatus comprising a pair of shaping drums for shaping a heated strip of flexible material to form an indented groove of predetermined shape extending along a first side edge portion of the strip, a first one of the shaping drums having an inwardly extending annular channel and the second shaping drum having an outwardly projecting mandrel for mating with the annular channel as the drums rotate, the mandrel being shaped to form the indented groove, a folding device for folding and the strip lengthwise with the first edge portion and a second edge portion overlapping to form a first conduit, a sealing device for joining the first and second edge portions together at least along the outer side edges of the formed groove, and a device for providing a series of inlet ports between the first conduit and a secondary conduit defined by the groove, and a series of outlet ports between the secondary conduit and the exterior of the tape.

The channel in the first shaping drum may be of equivalent, mating shape to the mandrel on the second shaping drum, or it may be a straight channel where the mandrel is of serpentine configuration. The mandrel may be a continuous or segmented serpentine configuration, or may be a straight annular continuous or segmented channel. Suitable formations on the channel or mandrel, or both, may be provided for forming inlets and outlets to the groove once the overlying edges of the strip are sealed together on opposite sides of the groove.

However, the inlets and outlets are preferably formed by piercing orifices through regions of the side edges corresponding to inner and outer walls of the secondary conduit, for example by means of a drum with spikes at appropriate locations.

The groove may be formed entirely by pressing the plastic material between the mandrel and opposing channel, or alternatively vacuum may also be employed to force the plastic into the channel after it leaves the mandrel. In one embodiment, for example, the first drum may be a water cooled, vacuum drum and the opposing, mandrel drum may also be a water-cooled drum.

Forming the groove on a mandrel allows for a more uniform construction of the secondary conduit, so that the drip rate from a length of tubing formed by this method will be more consistent.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which:

FIG. 1 is a top plan view of a portion of a drip irrigation tape according to a first embodiment of the invention;

FIG. 2 is an enlarged sectional view taken on line 2—2 of FIG. 1;

FIG. 3 is a sectional view taken on line 3—3 of FIG. 2;

FIG. 4 is a sectional view taken on line 4—4 of FIG. 2;

FIG. 5 is a sectional view taken on line 5—5 of FIG. 2;

FIG. 6 is a sectional view taken on line 6—6 of FIG. 2;

FIG. 7 is a top plan view of a portion of hose showing an alternative serpentine channel;

FIG. 8 is a similar top plan view showing a further type of serpentine channel;

FIG. 9 is a side elevation view of apparatus for making the hose or tape;

FIG. 10 is a sectional view taken on line 10—10 of FIG. 9;

FIG. 11 is a top plan view of the heat sealing wheel;

FIG. 12 is an enlarged sectional view on the line 12—12 of FIG. 9;

FIG. 13 is a view similar to FIG. 12, but with the mandrel wheel raised for threading of the blank strip;

FIG. 14 is an enlarged sectional view taken on line 14—14 of FIG. 9, showing rolling of the hose;

FIG. 18 is a view of the hose similar to FIG. 6 but showing an alternative outlet construction;

DESCRIPTION OF THE PREFERRED EMBODIMENTS

Figure 15:
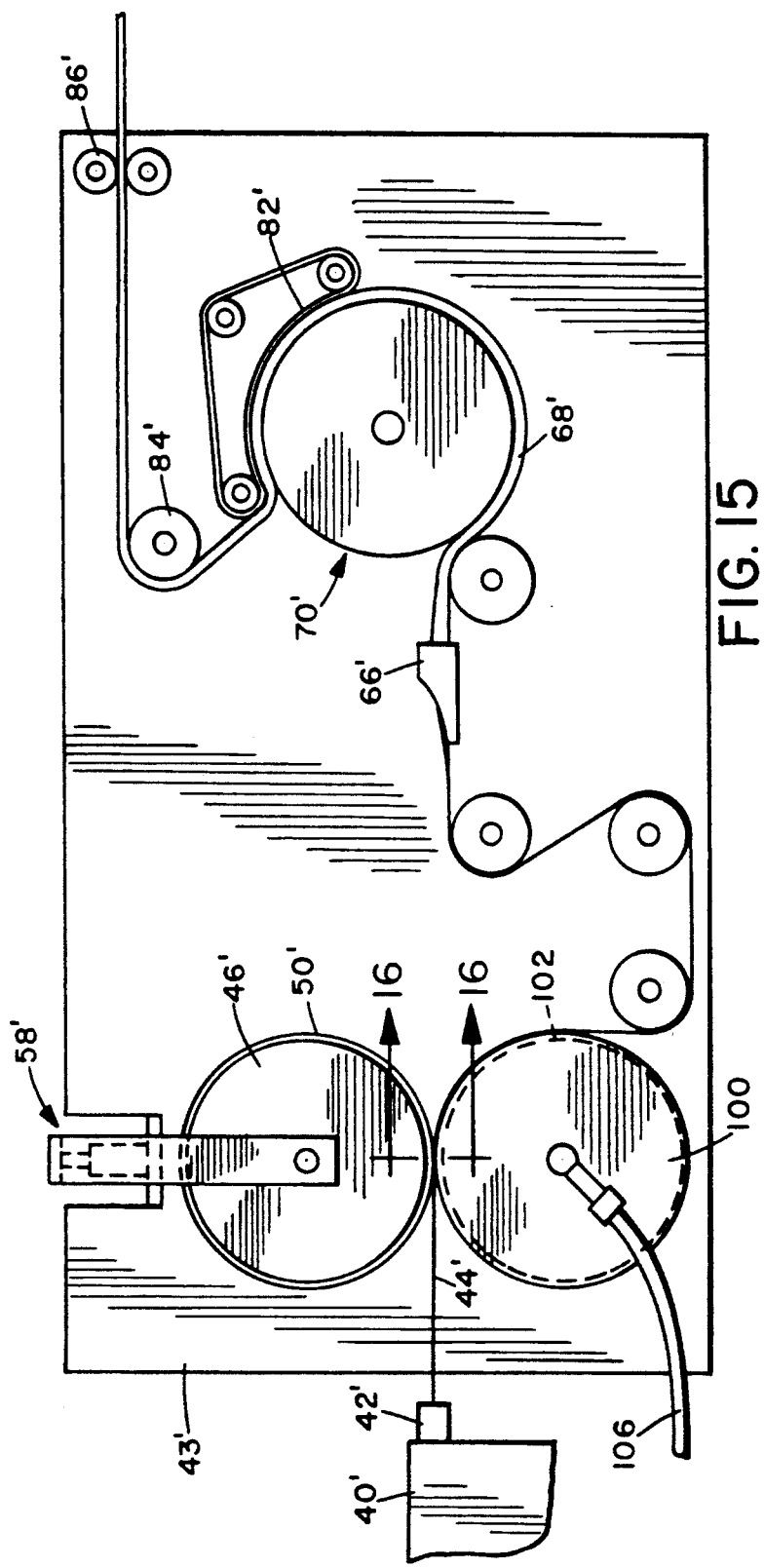
FIG. 15 is a side elevation view showing an alternative apparatus for making the irrigation tape.

FIGS. 1 to 6 of the drawings show a drip irrigation tape or hose 10 according to a preferred embodiment of the present invention. The tape 10 is formed from a strip of flexible, water impervious material such as polyethylene, suitably dimensioned for folding over with its side edges overlapping to form a primary conduit 12 for water or other fluid. A secondary conduit 14 is defined by an indented groove 16 of serpentine or zig-zag configuration formed in one of the overlapping side edges of the strip. The opposing side edges are sealed together along space seal lines 18, 20 which are spaced from the outer side edges 22 of the groove, as best seen in FIG. 1.

In the embodiment shown in FIG. 1, discrete serpentine channel segments 24 of a desired length extend along the tape, each segment having a series of parallel outlets 28 at the opposite end. Inclined transverse seal lines 30 separate the successive channel or groove segments 24. The inlets and outlets may be formed by suitable indentations in the overlapping side edge of the strip, in the same way as the serpentine groove. Gaps 32, 34 are provided in the seal lines 18, 20, respectively in the region of inlets 26 and outlets 28, as seen in FIG. 1.

Although serpentine channel segments are shown in FIG. 1, the groove or secondary conduit may alternatively be continuous, with spaced inlets and outlets provided along its length in an equivalent fashion. Instead of a plurality of parallel inlets and outlets as shown in FIG. 1, pairs of inlet channels defining a V-shape leading into the conduit may be provided, as in my U.S. Pat. No. 4,722,759 referred to above, and the outlets may be defined simply by spaced breaks in one of the seal lines. Alternatively, a single outlet may be provided in place of parallel outlets 28.

Figure 17:
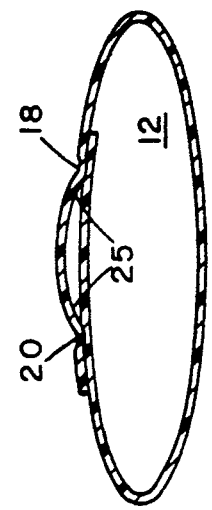
FIG. 17 is a sectional view of the hose similar to FIG. 6 but showing the channel expanded to clear an obstruction.

FIGS. 7 and 8 show two alternative configurations 33, 35 for the serpentine channel. The configuration will depend on the desired flow characteristics and also in ease of manufacture of the channel or groove, as explained in more detail below. The turbulent flow resulting from the constantly changing direction will tend to keep small particles of grit and dirt moving along the channel without causing a blockage. The provision of linear seal lines spaced from the side edges of the channel has the advantage of being simple to manufacture and also of helping to shift any blockages. Thus, if the serpentine channel 16 of FIG. 1 should become blocked, for example at the location shown in FIG. 6, water will back up behind the blockage as it is flowing constantly along the main conduit and into the secondary conduit segments 24. The resultant water pressure will cause the opposing faces 25 of the side edges of the strip on opposite sides of the channel between the seal lines to deform away from one another, as generally indicated in FIG. 17. This allows a gush of water to flow along the channel, tending to shift the blockage. After the blockage has shifted, the overlapping side edges will collapse back together as shown in FIG. 6. The design of the serpentine channel with spaced seal lines thus considerably reduces the risk of blockages which would otherwise cut off water from adjacent areas of soil surrounding the tube.

One problem with forming an irrigation hose or tape by overlapping side edges of the tape and then sealing them together is that the outer free margin of the outermost side edge outside the seal line forms a flap under which roots tend to grow. If unrestricted, the roots will travel along the flap and tend to grow into and block the water outlets in their path. Root deflectors 36 may be provided at spaced intervals along the flap 38 as shown in FIG. 1, to reduce the risk of root blockages. As shown in FIG. 1, deflectors 36 are formed by spaced transverse seal lines extending from outermost seal line 20 to the outer margin of flap 38, sealing the flap to the underlying face of the tape. The deflectors are provided at suitable spaced intervals, and on opposite sides of each of the outlets 28 to restrict root growth from blocking the outlets. Thus a root growing along beneath the flap 38 will be deflected outwardly when it meets a deflector 36. Additionally, or alternatively, the outlets may be replaced by one or more small orifices of the order of 1/16" diameter through the channel walls so that roots cannot grow into them. FIG. 18 shows a modified version of the tape in which one or more orifices 39 are provided in the bottom of the channel at the end of each segment. These holes may be stamped in the tape at appropriate spacings after forming the channel. With this version, any roots growing under the flap will not approach the outlets.

FIGS. 9 to 14 illustrate an apparatus according to another aspect of the present invention for manufacturing drip irrigation tape. This apparatus is suitable for manufacturing the tape shown in FIGS. 1 to 6, as well as alternative types of tape having continuous serpentine flow channels and different designs of inlets and outlets. The apparatus may also be used for manufacturing straight channels, as explained below.

As shown in FIG. 9, the apparatus comprises an extrusion device 40 for forming a thin film of suitable plastics material such as polyethylene. The extrusion device will be of a standard type including an extrusion die 42 through which the thin film 44 is forced. The remainder of the apparatus is mounted on a suitable supporting frame 43, illustrated schematically in FIG. 9.

After extrusion, the film or strip passes between opposed shaping drums or rollers 46, 48 for forming the indented channel or groove in one side edge of the strip. The first shaping drum 46 has a projecting mandrel 50 extending around its periphery, and the second drum 48 has a corresponding annular channel 52 in registry with mandrel 50.

The mandrel is formed with a pattern corresponding to the desired shape of the groove in the side edge of the strip. If a continuous serpentine groove is to be formed, the desired serpentine shape will be cut into the mandrel. If a series of serpentine segments are to be formed, as illustrated in FIG. 1, corresponding segments will be formed around the periphery of the mandrel, with the number of repeats depending on the desired segment length and the diameter of the drum. The inlets and outlets may also be formed in the mandrel, as illustrated in FIG. 10. The channel in the second drum may also be formed with a mating indented serpentine shape and inlets and outlets corresponding to that on the mandrel. However, in the preferred embodiment the channel is a straight annular channel which receives the serpentine shape mandrel, with the forming taking place around the mandrel alone. This is less expensive and avoids the practical problems of having to have perfect registry between the opposing serpentine formations. The channel 52 may be provided with inlet and outlet formations, so that the mandrel presses the plastic strip into these formations to form the inlets and outlets.

In the version shown in FIGS. 9 to 13, the shaping drums are designed to form a series of separate, serpentine channel segments. Thus each of the drums is mounted on an axle 54 secured to a suitable gear wheel 56, as best seen in FIG. 12, with the teeth of the opposing gear wheels meshing to ensure that any co-operating formations on the mandrel and opposing channel remain in registry. For example, where the inlets and outlets are provided in the channel 52, they must remain in registry with the gaps between successive serpentine segments on mandrel 50. Similarly, where co-operating serpentine segments are provided on the mandrel and channel they must also be kept in registry to ensure accurate forming and to avoid damage to the drums. Where a continuous serpentine channel is formed, the gear wheels will not be necessary.

The same basic arrangement can be used with interchangeable mandrel drums for producing different lengths of serpentine channel segments. For example, a mandrel of 36 inches circumference can be used to form four successive 9 inch channel segments, 3 successive 12 inch segments, or two successive 18 inch segments. Thus three interchangeable mandrel drums with different channel lengths may be provided. Similarly, the opposing drum 48 may be of equivalent circumference and interchangeable drums with the corresponding gaps between inlet and outlet channels may be provided.

The first drum is rotatably mounted on a pneumatic lifting assembly 58, as best shown in FIGS. 12 and 13, which allows the drums to be separated to allow plastic film to be threaded between the drums. The assembly includes a yoke 60 in which opposite ends of the shaft 54 are rotatably mounted, and a pneumatic ram or piston 62 which is mounted on a platform 64 secured to back plate 43. The ram 62 acts between the stationary platform 64 and the upper end of yoke 60, so that when it is fully extended as illustrated in FIG. 13 it lifts the yoke together with drum 46 and associated gear wheel 56 upwardly and away from the opposing drum 48. This leaves a small gap through which the plastic film can be threaded In practice a gap of the order of ⅛ inch will be sufficient, leaving the teeth of the opposing gear wheels 56 in meshing engagement. Once the film has been threaded, the ram is retracted allowing the drum to lower back into the position shown in FIG. 12.

Referring back to FIG. 9, the film or strip in which the desired serpentine groove or channel with inlets and outlets has been formed by shaping drums 46, 48 will pass around drum 46 and a series of guide rollers for reversing the strip so that the indented channel or groove faces in the correct direction before reaching the folding device 66. The folding device is a suitable known mechanical structure which folds the strip or tape lengthwise as it passes through, as generally indicated in FIG. 14, so that the opposite side edges of the strip overlap with the indented groove in one side edge facing the opposing side edge. The groove may be on the inside or outside of the tape when folded as illustrated in the alternative configurations of FIGS. 18 and 24. The configuration of FIG. 24 has the advantage that the tape will have a smooth uninterrupted outer periphery.

After passing through the folding device 66, the folded strip 68 passes around sealing assembly 70 for sealing the overlapping side edges of the strip together along the spaced seal lines, forming a secondary conduit defined by indented channel or groove 14. The sealing assembly is of a similar nature to that described in my U.S. Pat. No. 4,807,668, referred to above, and consists of a heat sealing drum. The drum is shown in more detail in FIG. 11. The drum 70 is heated, and has an annular recessed area 72 having a pair of outwardly extending annular ribs 74, 76 on opposite sides which are spaced apart by the desired separation of seal lines 18 and 20, which may be of the order of 0.125–2.00 inch. The separation between ribs 74, 76 is sufficient to provide the desired separation between the outer side edges of indented channel formed in the strip and the seal lines, as explained above. This separation is of the order of 0.04 to 0.08 inch in one embodiment of the invention.

Gaps 77 are provided along each of the ribs at spaced intervals for the inlets and outlets. Inclined transverse ribs 78 extend between ribs 74, 76 at spaced locations for forming transverse seal lines 30. Short ribs or teeth 80 project outwardly from rib 74 at spaced locations for forming the root deflectors 36. The rib formations extend outwardly from the outer circumference of drum 70 to apply pressure to the overlapping edge portions of the folded strip of tape while at the same time heating the strip to form the desired seal lines as the strip passes over the drum. The ribs are about 0.05 inches wide and project outwardly about 0.04 to 0.08 inches from the drum.

The gaps in the ribs provide breaks in the heat seal lines for entry of the inlets and outlets. Drum 70 will be synchronized with the shaping drums 46, 48 by suitable means such as a toothed belt or chain and sprocket so that the gaps in the heat seal lines are provided at the correct locations of the inlets and outlets. The drum 70 is electrically heated to form the seal, with the folded tubing passing between the drum and a pressure belt assembly 82 for pressing the overlapping strip edges against the heat sealing drum to form the seal lines. After leaving the heating drum 70, the formed tubing passes around a guide roller 84 and between exit rollers 86 onto a take up reel (not shown) where it will be stored.

After leaving the heating drum 70, the formed tubing passes around a guide roller 84 and between exit rollers 86 onto a take up reel (now shown) where it will be stored.

This technique and apparatus allows drip irrigation tape with a relatively complex serpentine secondary flow channel to be formed quickly, inexpensively and easily, and also provides a product with relatively uniform flow characteristics due to the accuracy of forming on a mandrel. Although the apparatus described is for forming serpentine channels in the tubing, it would also be advantageous to form a straight continuous or segmented channel, for example of the type shown in my U.S. Pat. No. 4,722,759, in a similar manner. In this case the mandrel will comprise a linear annular projection without any serpentine formations. The projection may be segmented if a non-continuous flow channel is desired, and may be provided with suitable inlet and outlet formations. Alternatively or additionally, these formations may be provided in the receiving indent or channel on the opposing drum surface.

Figure 16:
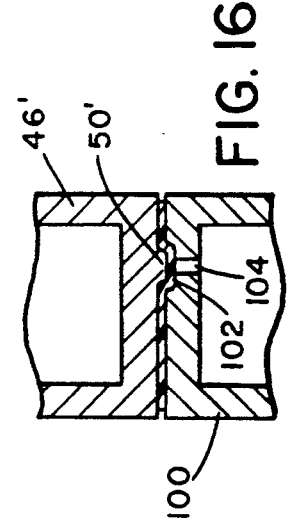
FIG. 16 is a view on the line 16—16 of FIG. 15.

The drums may be water cooled in a known manner, and vacuum may additionally be used to aid in shaping the strip. FIGS. 15 and 16 of the drawings show an alternative embodiment of the apparatus for forming the strip additionally employing a vacuum to urge the strip into suitable forms either on the mandrel or in the opposing channel. This embodiment employs a shaping drum 100 of an equivalent type to that described in U.S. Pat. No. 4,807,668 having annular channel 102 and pairs of auxiliary channels that intersect the annular channel at intervals around the circumference to form inlets to the secondary conduit. Suitable suction inlets 104 are provided at least in the auxiliary channels and are connected to a suitable vacuum source along hose 106.

A shaping drum 46' has a projecting mandrel 50' as in the previous embodiment, and opposes the drum 100 for forming the desired shape of groove. Thus, after being pressed around the mandrel, the strip is forced into the auxiliary channels of drum 100 to form the inlets. Formed outlets may be provided in a similar manner, or the outlets may simply comprise gaps in the outermost heat seal line as in my earlier Patents referred to above. The apparatus in FIG. 15 is otherwise identical to that shown in FIG. 9 and like reference numerals with primes have been used where appropriate. Vacuum may be applied along the length of the channel 102 if desired to hold the strip into the channel after forming with the mandrel.

In the two embodiments of the apparatus described above, the two shaping wheels or drums are of equivalent size, suitably 36 inch diameter drums. However, the forming or shaping operation can be made faster by making the mandrel wheel smaller, for example 16 inches circumference. In the case of a serpentine segmented channel, this means the mandrel would only have to have two repeats of the serpentine segment instead of up to six, so that greater accuracy can be achieved since machining discrepancies between the different segments are reduced by only having two different segments on the mandrel.

FIGS. 19 to 24 illustrate steps in a modified method and apparatus for forming drip irrigation tape. Apart from the modifications specifically described below, the apparatus will be equivalent to that illustrated in FIGS. 9 to 18.

Figure 19:
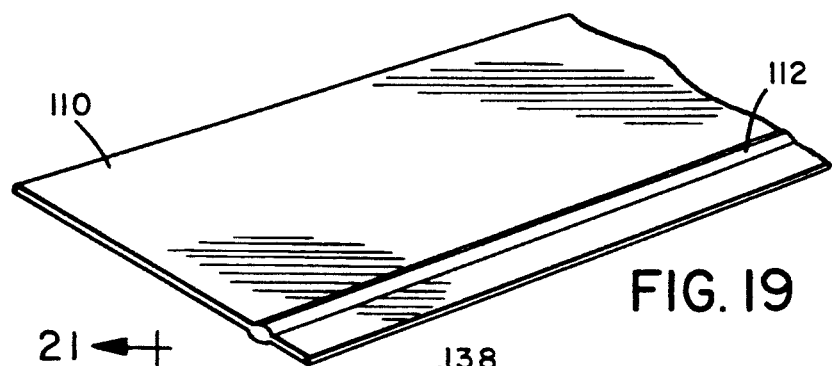
FIG. 19 is a perspective view of a portion of a strip of material extruded to form a tape according to further embodiment of the invention.

The modified apparatus of this embodiment includes an extrusion device as in FIG. 9, but arranged to extrude a strip 110 as illustrated in FIG. 19 having an elongate bulge or thickened portion 112 extending along a side edge portion of the strip in a region corresponding to that where the indented channel is to be formed. The extrusion die will have a slot with an enlarged area or recess corresponding to the desired bulged area on the extruded strip. The strip 110 may be used to form an indented channel of any desired shape, as described in the previous embodiments.

Figures 20, 21:
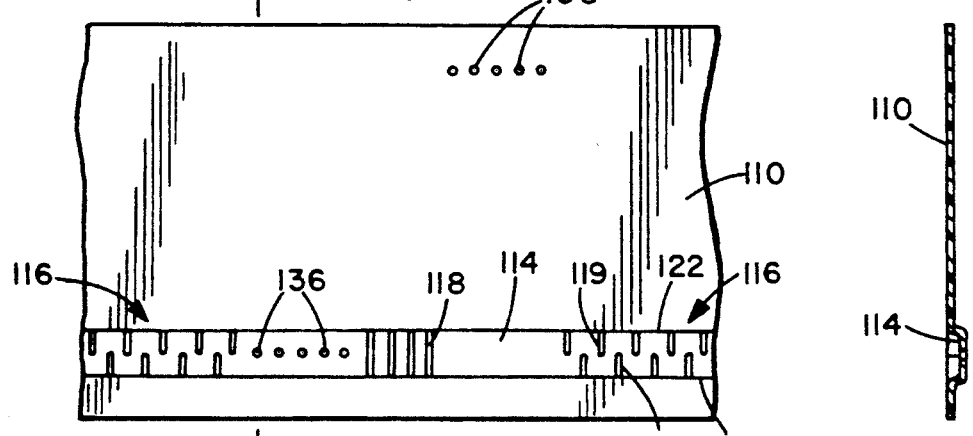
FIG. 20 is a top plan view of a portion of the strip molded to form an indented channel according to another embodiment of the invention.
FIG. 21 is a sectional view on the line 21—21 of FIG. 20.

The extruded strip with bulge 112 is passed between opposed shaping drums or rollers as in the embodiment illustrated in FIG. 9. The projecting mandrel on one of the drums may have the shape illustrated in FIG. 10, for example, or any corresponding to a desired groove pattern. FIGS. 20 and 21 illustrate one alternative pattern which may be formed in groove 114 in strip 110 after leaving the shaping drums, by suitably shaping the mandrel 50. As illustrated, the groove 114 has a series of serpentine segments 116 separated by transverse ribs 118, each segment having interleaved short ribs 119, 120 extending alternately from opposite side edges 122, 124 of the groove to form the serpentine pattern.

Figure 22:
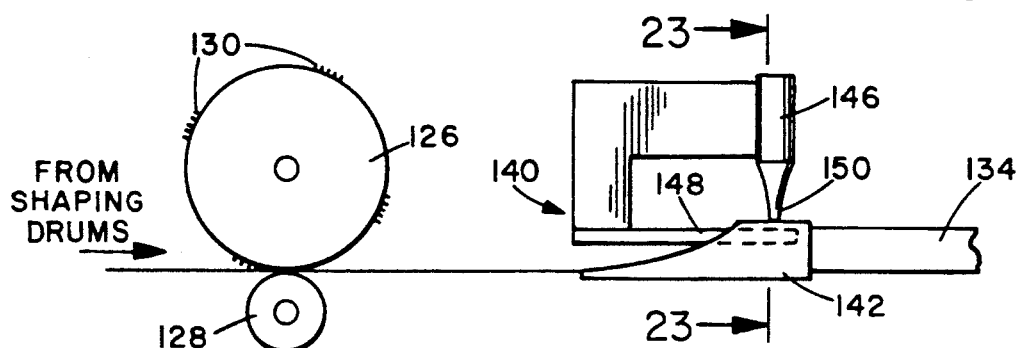
FIG. 22 is a side elevation view of part of a modified apparatus for forming the tape, illustrating an inlet and outlet forming device and a modified folding and sealing device.

The strip illustrated in FIGS. 20 and 21 is shown as it will appear after passing between the shaping drums and between opposing hole forming or stamping drums 126, 128 as illustrated in FIG. 22. The hole forming stage of the modified apparatus replaces the forming of inlets and outlets on the mandrel as in the previous embodiment, and thus makes the mandrel structure much simpler. Since the channel pattern is continuous without any gaps the two drums 46 and 48 do not need to be synchronized or timed as they were in the first embodiment, making the construction and operation much simpler. Thus, the drums do not have to be geared together as in the embodiment illustrated in FIGS. 12 and 13. The hole forming device or drums will be situated at a convenient position between the channel shaping drums and folding stage.

Figure 24:
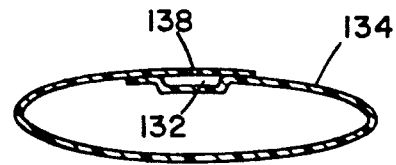
FIG. 24 is a sectional view similar to FIG. 18 illustrating a modified tape.

The hole forming device comprises a drum 126 having a series of spikes 130 at appropriate locations adjacent its opposite side edges corresponding to the opposing side edge portions of the strip which will subsequently be overlapped to form a channel or secondary conduit 132 in the tape 134 as illustrated in FIG. 24. Where the tape is formed with a series of serpentine segments, the spikes will be provided in spaced groups positioned to form one or more inlet holes 136 at one end of each segment and one or more outlet holes 138 in the opposite side edge of the tape at the opposite end of each segment (see FIG. 20). Preferably, the tape is folded in this modified embodiment so that the side edge portion having the groove is innermost, as illustrated in FIG. 24. This produces a finished product with a smoother tubular outer surface. In this case, the inlet holes 136 are provided in the base of groove 114, and the outlet holes 138 are provided in the portion of the opposite side edge of the tape which will overlap the groove. Holes 136 in the base of the groove may be provided by longer spikes or by providing the spiked drum or opposing drum with a rib for running along the channel as the holes are pierced. The mandrel and hole piercing drums will be suitably synchronized, for example by a suitable drive linkage such as a toothed belt or chain and sprocket, to ensure correct positioning of the inlet and outlet holes relative to the serpentine channel segments. Where a tape with a continuous channel is formed, timing is not as critical and inlets and outlets may be formed as desired. The inlet and outlet holes may alternatively be formed by a laser in place of spiked drum 126.

After the inlet and outlet holes are formed, the strip (which will now appear as illustrated in FIGS. 20 and 21) is fed into the folding and sealing apparatus 140 which replaces the folding device 66 and sealing apparatus 70 of FIG. 9.

Figure 23:
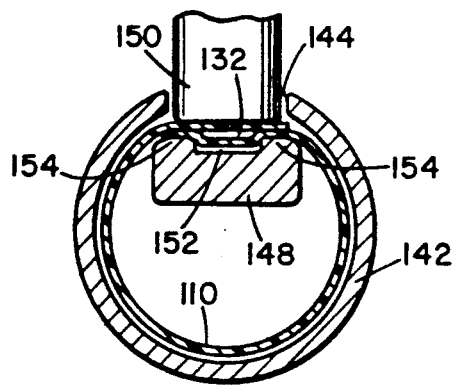
FIG. 23 is a sectional view on the line 23—23 of FIG. 22.

The folding apparatus comprises a folding device 142 of the same type as illustrated in FIG. 9, but having an opening 144 in its wall corresponding to the location of the channel 132 when the opposite side edges of the tape are overlapped (see FIG. 23). An ultrasonic welding device 146 projects through opening 144 into contact with the outer surface of the channel, as illustrated in FIG. 23. Ultrasonic welding devices are well known in the plastics industry and will therefore not be described in detail here. A suitable supporting tongue 148, which may be mounted on welding device 146 as illustrated in FIG. 22, projects into the folding device to support the innermost side edge portion of the strip as it passes beneath the welding head 150. As best illustrated in FIG. 23, tongue 148 has a groove 152 for locating channel 114 when the strip is folded, and opposite side edge portions 154 for locating regions of the side edge of the strip on opposite sides of the channel or groove so that they are maintained in contact with opposing regions of the other, flat side edge portion. This ensures that the opposing areas of the side edge portions, including the ribs in the groove 114, are maintained in contact to be welded together by the ultrasonic welding device, and also separates the overlapping side edges from the opposing regions of the main conduit.

As the flat strip enters the folding device 142 its opposite side edges are folded together to overlap as illustrated in FIG. 23, forming a flattened tubular shape with a secondary conduit or channel 132. The tongue 148 is positioned to extend directly beneath opening 144 and welding head 150, so that as the strip is wrapped around, the groove or channel 114 will be located in groove 152. The opposing regions of the overlapping side edge portions are trapped between the welding head and supporting tongue, so that they will be joined or welded together as the finished hose leaves the apparatus 140, after which it will be wound onto a storage reel.

The modified apparatus described above is simpler and more convenient and will produce a tape or hose having a cross-section as generally illustrated in FIG. 24. The bulge 112 formed in the extruded tape ensures that the strip is not excessively thinned or weakened as it is deformed by the mandrel. In fact, as illustrated in FIG. 24, the wall in the region of groove 114 is preferably of substantially the same thickness as the remainder of the strip.

It is also more convenient to form the inlets and outlets as holes pierced through the inner and outer walls of the channel, as this avoids the difficulty of forming gaps in the sealed regions joining the opposite side edges of the strip together, and providing corresponding gaps on the shaping mandrel which must be precisely positioned to correspond to gaps on the sealing device. Although the spikes on the hole forming drum must more or less correspond to the desired inlet and outlet positions, the exact positioning will not be so critical in this case and a slight offset would not result in a non-functional hose, but simply one in which fluid possibly did not run along the entire length of a serpentine segment. Another advantage of forming the outlets as holes is that there is less chance of roots blocking the outlets.

Ultrasonic welding will produce a more uniform, solid connection at any place where the opposing surfaces are in contact, so that the seal can extend up to the outer sides of the strip on the inner and outer side of the overlapping regions, as indicated in FIG. 24. There is much less chance of seal failure and leakage in this modified version, and there will be no flap on the outside of the tape along which roots could grow. Welding will also occur along the ribs illustrated in FIG. 20 where they contact the overlapping opposite side edge portion of the tape.

The tape illustrated in FIG. 24 has groove 114 on the inside of the tape so that there is no external bulge and the tape is of smooth external appearance.

The apparatus and methods described above provide improved, faster and more accurate techniques for fabricating drip irrigation tape either with serpentine or straight secondary flow channels.

Although some preferred embodiments of the present invention have been described above by way of example only, it will be understood by those skilled in the field that modifications may be made to the disclosed embodiments without departing from the scope of the invention, which is defined by the appended claims.

I claim:

1. An apparatus for fabricating drip irrigation tape, comprising:

extruding means for extruding a heated strip of flexible material;

a pair of opposing shaping drums for shaping the heated strip of flexible material to form an indented groove of predetermined, serpentine shape extending along one side edge portion of the strip, a first one of the shaping drums having a smooth annular rim surface and a mandrel on the rim surface projecting circumferentially outwardly from said rim surface adjacent one side edge of said first drum, the mandrel being shaped to correspond to the desired serpentine shape of the indented groove, the second one of the shaping drums having a smooth annular rim surface opposing the rim surface of the first shaping drum and an annular channel on said rim surface extending inwardly from said smooth rim surface for receiving the mandrel as the drum rotates, the annular channel having a width substantially equal to the width of the projecting, serpentine mandrel;

the opposing smooth annular rim surfaces of the shaping drums comprising means for guiding the heated strip between the drums and the projecting serpentine mandrel and opposing annular channel comprising means for deforming and stretching a portion of the strip located between the mandrel and channel out of the plane of the remainder of the strip to form the indented groove;

a folding device for folding the strip lengthwise with the opposite side edge portions of the strip overlapping to cover the groove and form a first conduit within the folded strip;

a sealing device for joining the overlapping edge portions together in face-to-face contact at least along opposite sides of the groove;

port forming means for providing a series of inlet ports between the first conduit and a secondary conduit defined by the groove, and a series of outlet ports between the secondary conduit and the exterior of the tape; and the extruding means comprising means for forming a thickened portion in the strip extending along said first edge portion in the region where the indented groove is to be formed, and projecting outwardly from opposite faces of the strip, and said opposing shaping drums further comprising means for stretching said thickened portion to reduce the thickness of said portion when forming the indented groove.

2. The apparatus as claimed in claim 1 wherein the serpentine configuration is continuous around the periphery of the drum.

3. The apparatus as claimed in claim 1, wherein the serpentine configuration comprises a series of separate serpentine segments formed around the circumference of the mandrel for forming a series of separate serpentine channel segments along the side edge of the strip.

4. The apparatus as claimed in claim 1, wherein the port forming means comprises means for piercing orifices through the side edge portions of the strip in regions corresponding to the inner and outer walls of the secondary conduit.

5. The apparatus as claimed in claim 1, wherein the sealing device comprises an ultrasonic welding device.

6. The apparatus as claimed in claim 1, wherein the annular channel is a straight, linear channel having a width equal to the maximum width of the serpentine mandrel.

* * * * *